United States Patent
Yang et al.

(10) Patent No.: US 11,832,154 B2
(45) Date of Patent: Nov. 28, 2023

(54) APPARATUS FOR SHARING DATA OF VEHICLE AND METHOD THEREOF

(71) Applicants: Hyundai Motor Company, Seoul (KR); Kia Corporation, Seoul (KR)

(72) Inventors: Dong Il Yang, Seoul (KR); Eun Young Choi, Seoul (KR); Ki Seok Seong, Cheonan-Si (KR); Min Sang Yu, Hwaseong-Si (KR); Hyeong Jin Ham, Seongnam-Si (KR); Rosali Sun Pyun, Seongnam-Si (KR); Jin Su Jeong, Suwon-Si (KR); Woo Jin Kim, Incheon (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 237 days.

(21) Appl. No.: 17/358,626

(22) Filed: Jun. 25, 2021

(65) Prior Publication Data

US 2022/0070637 A1 Mar. 3, 2022

(30) Foreign Application Priority Data

Aug. 28, 2020 (KR) .......................... 10-2020-0109258

(51) Int. Cl.
*H04W 4/44* (2018.01)
*H04W 4/48* (2018.01)

(52) U.S. Cl.
CPC ............... *H04W 4/44* (2018.02); *H04W 4/48* (2018.02)

(58) Field of Classification Search
None
See application file for complete search history.

(56) References Cited

U.S. PATENT DOCUMENTS

2020/0029189 A1* 1/2020 Fox ..................... H04W 4/40
2020/0312047 A1* 10/2020 Goluguri ............. H04W 4/40

* cited by examiner

*Primary Examiner* — Frantz Bataille
(74) *Attorney, Agent, or Firm* — MORGAN, LEWIS & BOCKIUS LLP

(57) ABSTRACT

A vehicle data sharing apparatus and a vehicle data sharing method, may include a processor configured to subdivide a sharing range of vehicle data for each group according to a range of a subject driving a vehicle, and to obtain consent from a user for each subdivided group, to perform vehicle data sharing; and a storage configured to register consent information related to a sharing range of vehicle data acquired from the user.

20 Claims, 7 Drawing Sheets

CUSTOMER CONSENT INFORMATION OF TRANSMISSION DATA
(DRIVING RANGE : DRIVER + FAMILY ONLY)

REQUIRED OR OPTIONAL INFORMATION CAN BE PROVIDED FOR A FEE TO THE ENTITY IN NEED THEREOF ACCORDING TO EU/DOMESTIC/US DATA ACCESS LEGISLATION WHEN DRIVING A VEHICLE.
FOR THE INFORMATION PROVIDED, ACCORDING TO THE LEVEL AND AMOUNT OF INFORMATION PROVIDED BY THE CUSTOMER, XXX COMPANY, THE BUSINESS ENTITY OF THE INFORMATION, CONVERTS A CERTAIN AMOUNT EACH MONTH AND PROVIDES CASH-BACK. PLEASE CHECK THE LEVEL OF INFORMATION YOU WISH TO PROVIDE BELOW

☑ (REQUIRED) DRIVING INFORMATION (ESSENTIAL VEHICLE DRIVING INFORMATION SUCH AS VEHICLE SPEED, OPERATION STATE OF MAIN SYSTEM SUCH AS LAMPS/DOORS, ETC.)

☑ (OPTIONAL) PERSONAL INFORMATION SET A (PERSONAL INFORMATION WITH LOW SENSITIVITY SUCH AS BLUETOOTH CONNECTION INFORMATION)

☐ (OPTIONAL) PERSONAL INFORMATION SET B (PERSONAL INFORMATION THAT HAS SLIGHT SENSITIVITY, SUCH AS NAVIGATION DESTINATION AND OUTDOOR VIDEO INFORMATION)

☐ (OPTIONAL) PERSONAL INFORMATION SET C (PERSONAL INFORMATION THAT MAY BE SENSITIVE, SUCH AS POSISTION INFORMATION, INDOOR VIDEO, PERSONAL INFORMATION, CONTACT INFORMATION, ETC.)

※ FOR THE INITIAL SELECTION AND DETAILED SHARING INFORMATION SELECTION, DETAILED SETTINGS CAN BE MADE IN USIM/SHARING APP

FIG. 4

APPARATUS FOR SHARING DATA OF VEHICLE AND METHOD THEREOF

CROSS-REFERENCE TO RELATED APPLICATION

The present application claims priority to Korean Patent Application No. 10-2020-0109258 filed on Aug. 28, 2020, the entire contents of which is incorporated herein for all purposes by this reference.

BACKGROUND OF THE INVENTION

Field of the Invention

The present invention relates to a vehicle data sharing apparatus and a method thereof, and more particularly, to a technique for sharing vehicle data in consideration of a driving subject range of an autonomous driving vehicle.

Description of Related Art

With the development of the vehicle industry, the development of an autonomous driving system and a driving assistance system (hereinafter, for convenience of description, both autonomous driving and driving assistance are referred to as autonomous driving) that partially enables autonomous driving has been developed.

The autonomous driving system may provide various functions such as maintaining a predetermined speed, maintaining a distance between vehicles, maintaining a lane, and changing a lane. Recently, efforts are being made to share vehicle data for A/S of autonomous driving control vehicles, and a platform for sharing vehicle data outside the vehicle and a process of obtaining user consent for sharing vehicle data are required to share such vehicle data. Accordingly, the necessity of developing a technique for performing processes for sharing vehicle data is emerging.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle data sharing apparatus and a method thereof, capable of securing accurate interaction with a user and increasing user convenience by efficiently providing a user consent procedure to the user by subdividing a range of sharing vehicle data depending on a driving subject range of an autonomous driving vehicle.

In addition, various aspects of the present invention are directed to providing a vehicle data sharing apparatus and a method thereof, capable of increasing data transmission cost and efficiency by differentiating data transmission mode depending on urgency and capacity of vehicle data.

The technical objects of the present invention are not limited to the objects mentioned above, and other technical objects not mentioned may be clearly understood by those skilled in the art from the description of the claims.

Various aspects of the present invention are directed to providing a vehicle data sharing apparatus including: a processor configured to subdivide a sharing range of vehicle data for each group according to a range of a subject driving a vehicle, and to obtain consent from a user for each subdivided group, to perform vehicle data sharing; and a storage configured to register consent information related to a sharing range of vehicle data acquired from the user.

In various exemplary embodiments of the present invention, the processor may identify a driver upon determining that the vehicle is turned on, and may determine whether the driver is a driver who has registered consent information or a driver who has not registered the consent information.

In various exemplary embodiments of the present invention, the processor may identify the driver based on at least one of iris information, voice recognition information, fingerprint recognition information, reservation information, and occupant sensing information.

In various exemplary embodiments of the present invention, the processor, when the driver is a driver who has not registered consent information, may obtains consent from the driver for each subdivided group and then share vehicle data based on a consented sharing range of the vehicle.

In various exemplary embodiments of the present invention, the processor, upon determining that the driver is the driver who has registered the consent information, may determine whether the driver is an existing driver who has previously driven the vehicle or is a registered third driver.

In various exemplary embodiments of the present invention, the processor may perform sharing the vehicle data based on a predetermined sharing range of vehicle data without an additional consent procedure, upon determining that the driver is already registered and is the existing driver who has driven the vehicle as a result of identifying the driver.

In various exemplary embodiments of the present invention, the processor may load previously stored consent information of the third driver and perform an inquiry to see whether the driver is the third driver, upon determining that the driver is already registered but is the third driver other than the existing driver, and performs vehicle data sharing by setting the sharing range of vehicle data based on the information that is consented by the third driver, upon determining that the driver is the third driver.

In various exemplary embodiments of the present invention, the apparatus may further include an interface device configured to display a screen for receiving information consent of at least one of the first group, the second group, the third group, and the fourth group.

In various exemplary embodiments of the present invention, the processor may provide a screen for guiding compensation for information consent through the interface device in addition to the screen for the information consent.

In various exemplary embodiments of the present invention, the processor may provide a screen displayed by selecting at least one of the first group, the second group, the third group, and the fourth group by default depending on a range of a subject driving the vehicle through the interface device.

In various exemplary embodiments of the present invention, the processor may provide a screen for consenting to additional information related to details under each of the first group, the second group, the third group, and the fourth group through the interface device, and may receive information consent or cancellation of information consent for one or more of the details from a user.

In various exemplary embodiments of the present invention, the range of the subject driving the vehicle may include at least one of an owner of a personal vehicle, a family of the owner of the personal vehicle, or a driver of a company vehicle or a shared vehicle.

In various exemplary embodiments of the present invention, the subdivided group may include: a first group that includes vehicle driving information that must be essentially shared; a second group that includes personal information with lowest sensitivity; a third group that includes personal information with a medium level of sensitivity; and a fourth group that includes personal information with highest sensitivity.

In various exemplary embodiments of the present invention, the second group may include information that may be consented in the case of a personal vehicle having a plurality of subjects driving the vehicle, the third group may include information that may be consented in the case of a personal vehicle having one subject driving the vehicle, and the fourth group may include information with highest sensitivity for sharing regardless of a subject driving the vehicle.

In various exemplary embodiments of the present invention, the second group may include Bluetooth connection information of a driver, the third group may include at least one of navigation destination information and outdoor video information, and the fourth group may include at least one of vehicle position information, indoor video information, personal private information, and contact information.

In various exemplary embodiments of the present invention, the processor may separate transmission modes depending on urgency and capacity of data to be transmitted.

In various exemplary embodiments of the present invention, the processor may determine that urgency of data that must be transmitted in real time is high, and determines that urgency of data that does not require real-time transmission is low, In various exemplary embodiments of the present invention, the processor may share the vehicle data in a real-time transmission mode based on a first communication speed, upon determining that the urgency of the data to be transmitted is high and the capacity of the data to be transmitted is less than a predetermined first reference value.

In various exemplary embodiments of the present invention, the processor may share the vehicle data in the real-time transmission mode based on a second communication speed that is lower than the first communication speed, upon determining that the urgency of the data to be transmitted is high, the capacity of the data to be transmitted is more than the first reference value and less than a predetermined second reference value.

In various exemplary embodiments of the present invention, the processor may share the vehicle data in a Wi-Fi transmission mode after vehicle driving is terminated upon determining that the urgency of the data to be transmitted is high and the capacity of the data to be transmitted is greater than or equal to the second reference value.

In various exemplary embodiments of the present invention, the processor may notify a user of a data transmission state during data transmission or when transmission is completed for sharing the vehicle data.

In various exemplary embodiments of the present invention, the data transmission state may include at least one of a data transmission mode, a data transmission amount, a data transmission status, a type of transmission data, a settlement sum for transmission data, and monthly or daily summary information.

In various exemplary embodiments of the present invention, the processor may determine total payment of money depending on the shared vehicle data to notify it of the user after sharing the vehicle data.

Various aspects of the present invention are directed to providing a vehicle data sharing method including: subdividing a sharing range of vehicle data for each group according to a range of a subject driving a vehicle; obtaining consent from a user for each subdivided group; and sharing the vehicle data according to the sharing range of the vehicle data consented for each user.

The present technique may provide a vehicle data sharing apparatus and a method thereof, capable of securing accurate interaction with a user and increasing user convenience by efficiently providing a user consent procedure to the user by subdividing a range of sharing vehicle data depending on a driving subject range of an autonomous driving vehicle.

In addition, according to the exemplary embodiment of the present invention, it is possible to increase a data transmission cost and efficiency by differentiating a data transmission mode depending on urgency and capacity of vehicle data.

In addition, various effects that may be directly or indirectly identified through this document may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 illustrates a block diagram showing a screen for guiding a vehicle data sharing consent according to various exemplary embodiments of the present invention.

Figure 1:
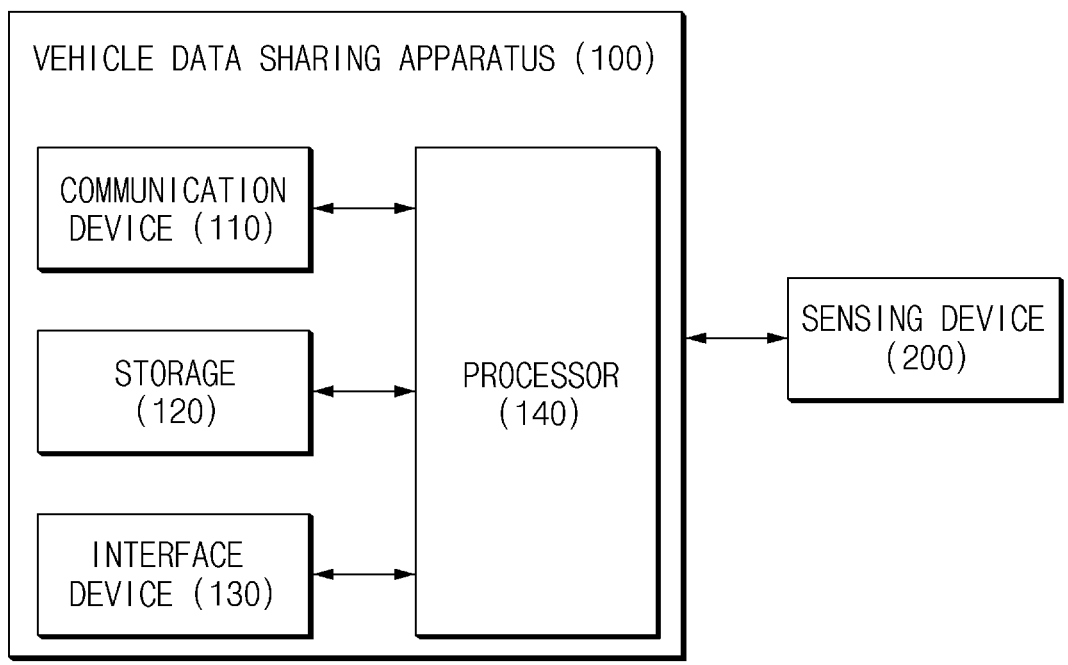
FIG. 1 illustrates a block diagram showing a configuration of a vehicle data sharing apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments of the present invention will be described in detail with reference to exemplary drawings. It may be noted that in adding reference numerals to constituent elements of each drawing, the same constituent elements have the same reference numerals as possible even though they are indicated on different drawings. In addition, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the Field of the Invention to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present invention will be described in detail with reference to FIG. 1 to FIG. 7.

Figure 2:
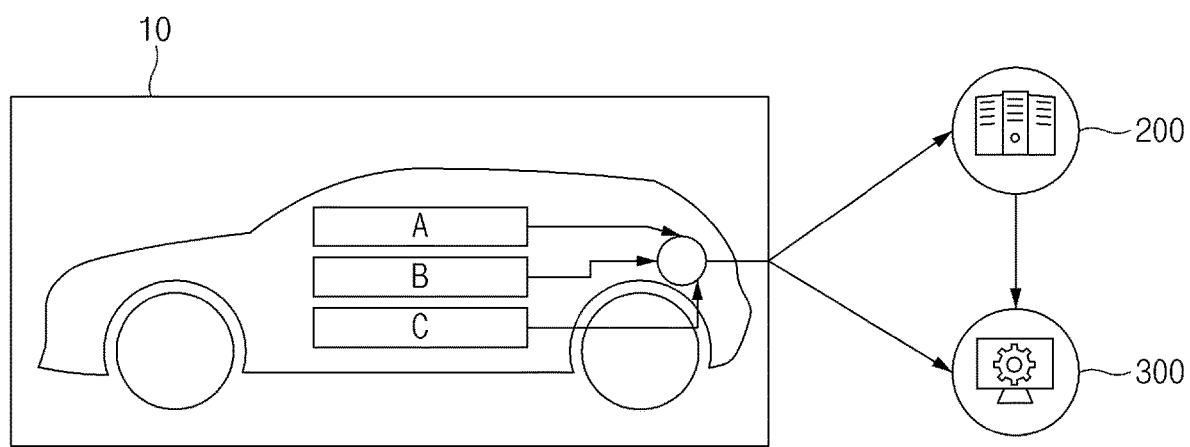
FIG. 2 illustrates a block diagram for sharing vehicle data according to various exemplary embodiments of the present invention.

FIG. 1 illustrates a block diagram showing a configuration of a vehicle system including a vehicle data sharing apparatus according to various exemplary embodiments of the present invention, and FIG. 2 illustrates a block diagram for sharing vehicle data according to various exemplary embodiments of the present invention.

Referring to FIG. 1, according to various exemplary embodiments of the present invention, the vehicle data sharing apparatus 100 may be implemented inside the vehicle. In the instant case, the vehicle data sharing apparatus 100 may be integrally formed with internal control units of the vehicle, or may be implemented as a separate device to be connected to control units of the vehicle by a separate connection means.

Referring to FIG. 2, the vehicle data sharing apparatus 100 may transmit vehicle data to a neutral server 200 and a third party service provider 300 outside the vehicle to share it.

The vehicle data sharing apparatus 100 may subdivide a sharing range of vehicle data for each group depending on a range of a subject driving the vehicle, may provide guidance information for obtaining consent from a user for each subdivided group, and may secure accurate interaction with the user and increase user convenience.

In addition, the vehicle data sharing apparatus 100 may increase a vehicle data transmission efficiency by transmitting vehicle data by separating transmission modes depending on urgency and capacity of data to be transmitted.

As illustrated in FIG. 1, the vehicle data sharing apparatus 100 may include a communication device 110, a storage 120, an interface device 130, and a processor 140.

The communication device 110, which is a hardware device implemented with various electronic circuits to transmit and receive signals through a wireless or wired connection, may perform V2I communication by use of an in-vehicle network communication technique or a wireless Internet access or short range communication technique with servers, infrastructure, and other vehicles outside the vehicle in various exemplary embodiments of the present invention. Herein, in-vehicle communication may be performed through controller area network (CAN) communication, local interconnect network (LIN) communication, or flex-ray communication as the in-vehicle network communication technique. In addition, the wireless communication technique may include wireless LAN (WLAN), wireless broadband (Wibro), Wi-Fi, Worldwide Interoperability for Microwave Access (WiMAX), etc. In addition, short-range communication technique may include Bluetooth, ZigBee, ultrawideband (UWB), radio frequency identification (RFID), infrared data association (IrDA), and the like.

As an example, the communication device 110 may transmit vehicle data to a neutral server 200 and a third party service provider 300 outside the vehicle.

In the instant case, the transmitted vehicle data may be subdivided into data transmission groups depending on a driving subject range and sharing. As an example, the vehicle data may include essential driving information and individual setting information. As an example, the essential driving information may include essential vehicle driving information such as a vehicle speed, an operation state of major systems, e.g., a lamp, a door, and the like.

As an example, the individual setting information may include personal information with lowest sensitivity such as Bluetooth connection information, navigation destination information, information with some sensitivity such as outdoor video information, information with highest sensitivity such as position information, indoor video information, personal private information, and contact information.

The storage 120 may store data and/or algorithms required for the processor 140 to operate, and the like.

As an example, the storage 150 may store a subject range of driving a vehicle and transmission data setting information subdivided depending on a user consent range.

In addition, the storage unit 150 may store consent information related to data transmission received from a user.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface unit 130 may include an input means for receiving a control command from a user and an output means for outputting an operation state and a result of the vehicle data sharing apparatus 100. Herein, the input means may include a key button, and may include a mouse, a joystick, a jog shuttle, a stylus pen, and the like. In addition, the input means may include a soft key implemented on the display. The output device may include a display, and may also include a voice output means such as a speaker. In the instant case, when a touch sensor formed of a touch film, a touch sheet, or a touch pad is provided on the display, the display may operate as a touch screen, and may be implemented in a form in which an input device and an output device are integrated. As an example, the output means may output monthly and daily summary information related to identified driver information, user consent information, a data transmission status, a data transmission amount, a transmission data type, a conversion amount, a data transmission amount, and a data transmission status.

In the instant case, the display may include at least one of a liquid crystal display (LCD), a thin film transistor liquid crystal display (TFT LCD), an organic light emitting diode display (OLED display), a flexible display, a field emission display (FED), and a 3D display.

The processor 140 may be electrically connected to the communication device 110, the storage 120, the interface device 130, and the like, may electrically control each component, and may be an electrical circuit that executes software commands, performing various data processing and determinations described below.

The processor 140 may process signals transferred between constituent elements of the vehicle data sharing apparatus 100. The processor 140 may be, e.g., an electronic control unit (ECU), a micro controller unit (MCU), or other subcontrollers mounted in the vehicle.

The processor 140 may subdivide a sharing range of vehicle data for each group depending on a range of a subject driving the vehicle, and obtain consent from a user for each subdivided group, to perform vehicle data sharing. In the instant case, the range of the subject driving the vehicle may include at least one of an owner of a personal vehicle, a family of the owner of the personal vehicle, or a driver of a company vehicle or a shared vehicle.

In other words, the subdivided group may include a first group (essential driving information) including vehicle driving information that must be essentially shared, a second group including personal information with lowest sensitivity (personal information A), a third group including personal information with medium sensitivity (personal information B), and a fourth group including personal information with highest sensitivity (personal Information C).

In the instant case, the first group may include essential vehicle driving information such as a vehicle speed, an operation state of major systems such as lamps and doors, etc., and essential shared data items, specified by ACEA (European Automobile Manufacturers Association).

The second group may include information that may be consented in the case of a personal vehicle having a plurality of subjects driving the vehicle, the third group may include information that may be consented in the case of a personal vehicle having one subject driving the vehicle, and the fourth group may include information with highest sensitivity for sharing regardless of a subject driving the vehicle.

The second group may include Bluetooth connection information of a driver, etc., the third group may include at least one of navigation destination information and outdoor video information, and the fourth group may include at least one of vehicle position information, indoor video information, personal private information, and contact information.

The processor 140 may provide a screen for obtaining consent of at least one of the first group, the second group, the third group, and the fourth group to a user through the interface device 130. The processor 140 may provide a screen for guiding compensation for information consent through the interface device 130 in addition to the screen for the information consent.

In addition, the processor 140 may provide a screen displayed by selecting at least one of the first group, the second group, the third group, and the fourth group by default depending on a range of a subject driving the vehicle through the interface device 130. This screen for information content will be described in more detail with reference to FIG. 4.

The processor 140 may identify a driver upon determining that the vehicle is turned on, and may determine whether the driver is a driver who has registered consent information or a driver who has not registered the consent information. In the instant case, the processor 140 may identify the driver based on at least one of iris information, voice recognition information, fingerprint recognition information, and reservation information.

That is, the processor 140 may identify the driver by recognizing an iris from video data obtained by capturing a face of the driver by a camera or by use of voice recognition, fingerprint recognition, occupant face, etc., and may identify the driver based on reservation information when an autonomous vehicle is a shared vehicle.

The processor 140 may obtain consent from the driver for each subdivided group and then share vehicle data based on a consented sharing range of the vehicle when the driver is a driver who has not registered consent information.

On the other hand, when the driver is the driver who has registered the consent information, the processor 140 may determine whether the driver is an existing driver who has previously driven the vehicle or is a registered third driver, and when the driver is the existing driver, the processor 140 may perform vehicle data sharing based on a predetermined sharing range of vehicle data. That is, when the driver is already registered as a result of driver identification and is an existing driver who has driven the vehicle, the processor 140 shares vehicle data based on the predetermined sharing range of vehicle data without an additional consent procedure.

Meanwhile, when the driver is a third driver, the processor 140 may perform vehicle data sharing by setting a sharing range of vehicle data based on information that is consented by the third driver. That is, when the driver is already registered but is the third driver other than the existing driver, the processor 140 loads previously stored consent information of the third driver and performs an inquiry to see if the driver is the third driver, and when the driver is the third driver, the processor 140 may perform vehicle data sharing by setting the sharing range of vehicle data based on the information that is consented by the third driver.

The processor 140 may receive consent for detailed information under each subdivided group from a user. That is, the processor 140 may provide a screen for consenting to additional information related to details under each of the first group, the second group, the third group, and the fourth group through the interface device 130, and may receive information consent or cancellation of information consent for one or more of the details from a user.

The processor 140 may modify consent information by providing the driver with a consent procedure again based on a user setting mode (USM) of the vehicle or a data sharing app setting window when it is necessary to modify consent information according to a request of the driver, etc. In addition, the processor 140 may add or exclude consent for various vehicle setting information, such as video or sound information inside or outside the vehicle, use information of a smartphone key, and information of intelligent mobility system (IMS) in addition to a group included in a major classification. In addition, when a driver with a unique habit of driving a vehicle does not want to share relevant information, the processor 140 may receive a non-consent to an item of the relevant information and apply it in data transmission. For example, a driver may always lie down on a passenger seat or may not consent to share setting information such as non-fastening of a seat belt, and the processor 140 may provide and receive such non-consent items and apply them in sharing data.

The processor 140 may separate transmission modes depending on urgency and capacity of data to be transmitted.

The processor 140 may share vehicle data in a real-time transmission mode based on a first communication speed (e.g., 5G) when the urgency of the data to be transmitted is high and the capacity of the data to be transmitted is less than a predetermined first reference value (e.g., 1G).

The processor 140 may share vehicle data in the real-time transmission mode based on a second communication speed (e.g., 4G) that is lower than the first communication speed, upon determining that the urgency of the data to be transmitted is high, the capacity of the data to be transmitted is more than the first reference value and less than a predetermined second reference value (e.g., 5G), The processor 140 may share vehicle data in a Wi-Fi transmission mode after vehicle driving is terminated upon determining that the urgency of the data to be transmitted is high and the capacity of the data to be transmitted is greater than or equal to the second reference value. In the case of such a large data capacity, communication costs may be reduced by performing transmission using Wi-Fi after vehicle driving is terminated.

The processor 140 may notify a user of a data transmission state during data transmission or when transmission is completed for vehicle data sharing. In the instant case, the processor 140 may notify the data transmission mode (e.g., a 5G transmission mode, a 4G transmission mode, and a Wi-Fi transmission mode), a data transmission amount, a data transmission status, a transmission data type, a conversion amount, etc. In the instant case, the processor 140 may transmit a notification to a mobile communication terminal of a user through the communication device 110 or may output notification contents to the in-vehicle interface device 130.

In addition, after the data transmission is completed, the processor 140 may notify monthly and daily summary information related to the data transmission amount and the data transmission state, and the like together therewith.

After sharing the vehicle data, the processor 140 may determine total payment of money depending on the shared vehicle data to notify it of the user. That is, the processor 140 may set a credit value depending on a type and amount of transmitted data, may settle it with points that may be converted into points, cashes, etc., and may induce the user to settle an amount of data provided every month by providing a settlement amount to an external server.

The sensing device 200 may include a sensor for identifying a driver. As an example, the sensing device 200 may include a camera, an occupant detecting sensor, a voice recognition sensor, a fingerprint recognition sensor, a driver monitoring system, and the like.

Accordingly, the sensing device 200 may transmit sensed information to the vehicle data sharing apparatus, and the vehicle data sharing apparatus 100 may identify a driver by recognizing an iris from video data obtained by capturing a driver's face by a camera, or may identify a driver by voice recognition, fingerprint recognition, occupant face, or the like.

Figure 3:
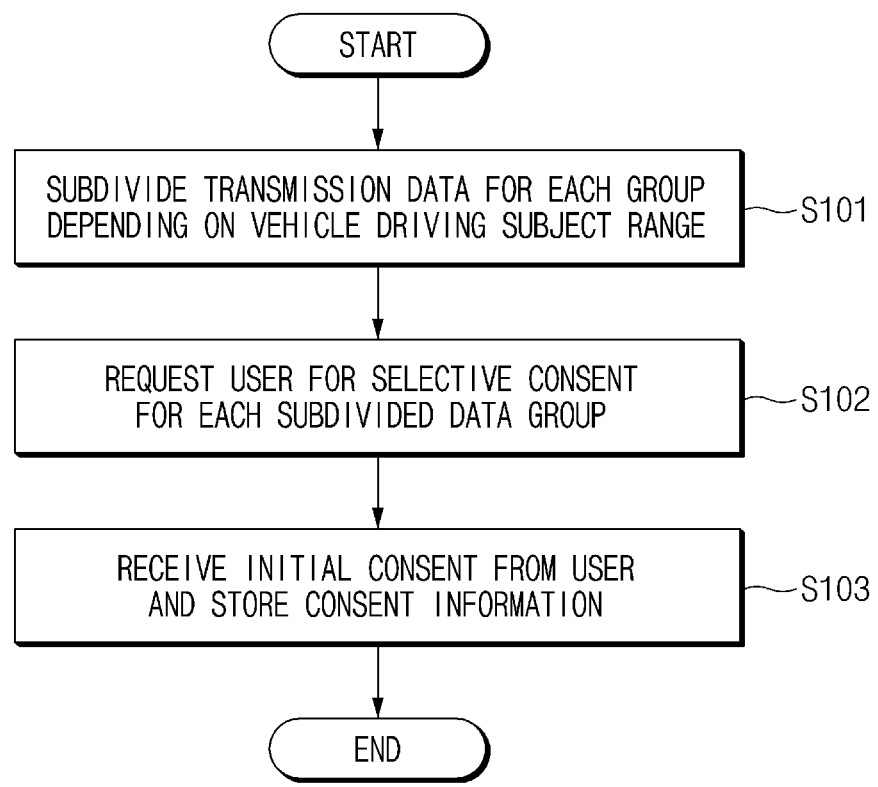
FIG. 3 illustrates a flowchart showing a vehicle data sharing consent method according to various exemplary embodiments of the present invention.

Hereinafter, a method of consenting to share vehicle data according to various exemplary embodiments of the present invention will be described in detail with reference to FIG. 3 and FIG. 4. FIG. 3 illustrates a flowchart showing a vehicle data sharing consent method according to various exemplary embodiments of the present invention, and FIG. 4 illustrates a block diagram showing a screen for guiding a vehicle data sharing consent according to various exemplary embodiments of the present invention.

Hereinafter, it is assumed that the vehicle data sharing apparatus 100 of the of FIG. 1 performs processes of FIG. 3. In addition, in the description of FIG. 3, operations described as being performed by a device may be understood as being controlled by the processor 140 of the LiDAR for each vehicle data sharing apparatus 100.

Referring to FIG. 3, the vehicle data sharing apparatus 100 subdivides transmission data for each group depending on a vehicle driving subject (hereinafter, a vehicle driving subject range, e.g., a driver) (S101). In the instant case, the vehicle driving subject range may include a driver range by vehicle insurance, and the apparatus 100 may be interlocked with an insurance company server to check the driving subject range.

The transmission data groups may be classified into essential driving information, personal information A, personal information B, and personal information C. As an example, the essential driving information is information that requires consent for data sharing regardless of the vehicle driving subject, and is displayed as an essential consent item as illustrated in FIG. 4. The essential driving information may include a vehicle speed, operation state of major systems such as a lamp and a door, and the like. In the instant case, the essential driving information may include items designated as essential shared data items by ACEA (European Automobile Manufacturers Association).

In the case of a personal vehicle having a plurality of subjects driving the vehicle, the personal information A may include personal information with a lowest level of sensitivity as sharable data items. As an example, the personal information A may include Bluetooth connection information and the like.

In the case of a personal vehicle having one subject driving the vehicle, the personal information B may include personal information with a medium level of sensitivity as sharable data items. As an example, the personal information B may include navigation destination information and outdoor video information.

The personal information C may include personal information with highest sensitivity as information that is difficult to consent regardless of a subject driving the vehicle. As an example, the personal information C may include vehicle position information, indoor videos, and personal private information.

The vehicle data sharing apparatus 100 requests a driver for selective consent for each subdivided data group (S102). In the instant case, user consent guide contents as illustrated in FIG. 4 may be outputted through the interface device 130 to receive consent from a driver, who is a user, through the interface device 130. The vehicle data sharing apparatus 100 may receive consent from a driver by subdividing data groups to be shared depending on a subject driving the vehicle.

In the instant case, the essential driving information is checked by default as essential content data, and for the personal information A, the personal information B, and the personal information C, which are optional information, the vehicle data sharing apparatus 100 may receive a selection of whether or not to consent to at least one of the personal information A, the personal information B, and the personal information C from the driver depending on the vehicle driving subject range.

That is, the vehicle data sharing apparatus 100 may perform guide by default by making a check mark in a group depending on the vehicle driving subject range among data transmission groups of the essential driving information, the personal information A, the personal information B, and the personal information C. In FIG. 4, it can be seen that essential driving information and personal information group A are checked and guided by default as an example of a case of a plurality of driving subjects of personal vehicle when the vehicle driving subject range is limited to a driver and his or her family.

In the instant case, the vehicle data sharing apparatus 100 may display a guide screen for obtaining consent depending on a vehicle driving subject range of a corresponding vehicle by recognizing the vehicle driving subject rang during initial driving of the vehicle.

The vehicle data sharing apparatus 100 may store consent information in the storage 120 upon receiving initial consent from the driver (S103).

Figure 5:
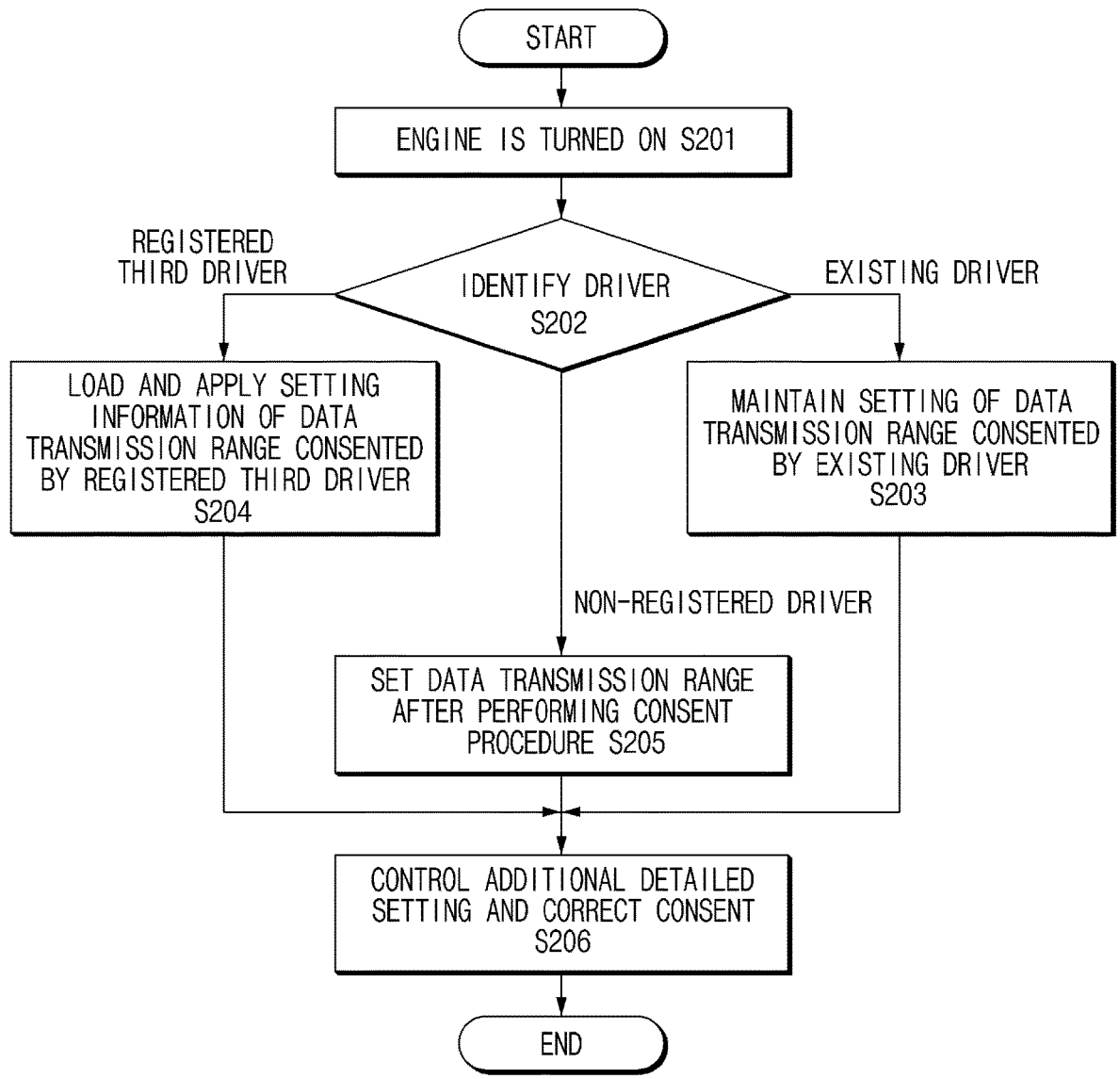
FIG. 5 illustrates a flowchart showing a method of setting vehicle data sharing for each driver according to various exemplary embodiments of the present invention.
Figure 6:
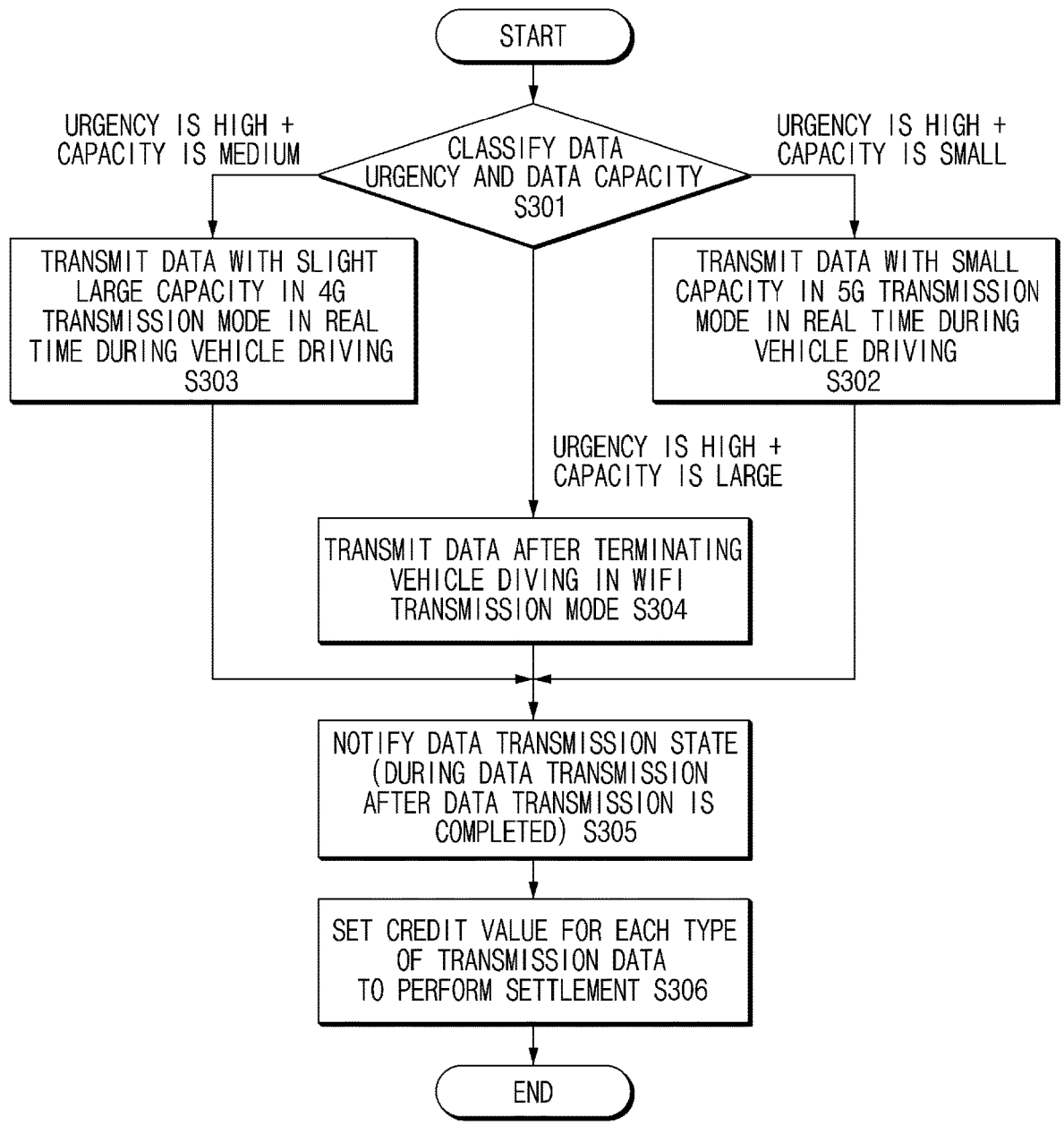
FIG. 6 illustrates a flowchart for describing a vehicle data sharing method depending on urgency and capacity of data according to various exemplary embodiments of the present invention.

Hereinafter, a vehicle data sharing setting for each driver and a vehicle data sharing method depending on data urgency and capacity according to various exemplary embodiments of the present invention will be described with reference to FIG. 5 and FIG. 6. FIG. 5 illustrates a flowchart showing a method of setting vehicle data sharing for each driver according to various exemplary embodiments of the present invention, and FIG. 6 illustrates a flowchart for describing a vehicle data sharing method depending on urgency and capacity of data according to various exemplary embodiments of the present invention.

Hereinafter, it is assumed that the data sharing apparatus 100 of FIG. 1 performs the processes of FIG. 5 and FIG. 6. In addition, in the description of FIG. 5 and FIG. 6, operations described as being performed by the device may be understood as being controlled by the processor 140 of the vehicle data sharing apparatus 100.

Referring to FIG. 5, when the vehicle data sharing apparatus 100 is turned on (S201), the vehicle data sharing apparatus 100 identifies a driver who has boarded the vehicle (S202).

In the instant case, the vehicle data sharing apparatus 100 may identify a driver based on a sensing result of a driver monitoring system, a passenger detection sensor, a voice recognition sensor, a fingerprint recognition sensor, or reservation information related to a shared vehicle.

In addition, the vehicle data sharing apparatus 100 may determine whether there is consent information related to a data transmission range (data sharing range) of the driver after identification of the driver.

That is, the vehicle data sharing apparatus 100 may determine whether the driver is an existing driver who has previously driven the vehicle, whether consent information is registered but the driver is a third driver other than the existing driver, and whether the driver is an unregistered driver for which consent information is not registered.

Accordingly, when the driver is the existing driver who has previously driven the vehicle, the vehicle data sharing apparatus 100 maintains a setting of the consented data transmission range of the existing driver (S203). For example, when the existing driver has consented to a group of the personal information A and the essential driving information, vehicle data sharing was already being performed based on the group of the personal information A and the essential driving information, and the vehicle data sharing may be continued based on the group of the personal information A and the essential driving information.

On the other hand, when the identified driver is a driver whose consent information is registered, but is a third driver other than the existing driver, the vehicle data sharing apparatus 100 may load and apply setting information related to the data transmission range (setting information related to the data sharing range) consented by the third driver (S204). For example, in the case where a plurality of drivers exist in a personal vehicle, when a first driver is changed to a second driver in a state where the first driver has contented to the group of the personal information A and the second driver has consented to a group of the personal information B, the vehicle data sharing apparatus 100 may perform the vehicle data sharing based on the group of the personal information B, which is consented information related to the second driver B. When the driver is changed in this way, the vehicle data sharing apparatus 100 may output a phrase "Are you second driver B?" through the interface device 130 to check the driver and then change the setting of the vehicle data transmission range.

In addition, when the identified driver is a driver whose consent information is not registered, the vehicle data sharing apparatus 100 determines that he/she is an unregistered driver and sets a data transmission range after performing the consent procedure depending on the data transmission range as illustrated in FIG. 2 (S205).

Subsequently, the vehicle data sharing apparatus 100 may receive a correction of consent information from the driver or additional detailed setting (S206).

The vehicle data sharing apparatus 100 may modify consent information by providing the driver with a consent procedure again based on a user setting mode (USM) of the vehicle or a data sharing app setting window when it is necessary to modify consent information according to a request of the driver, etc.

In addition, the vehicle data sharing apparatus 100 may display the transmission data group by categorizing it into four groups (essential driving information, personal information A, personal information B, and personal information C), but may obtain consent by displaying detailed information items for each major category item.

The vehicle data sharing apparatus 100 may add or exclude consent for various vehicle setting information, such as video or sound information inside or outside the vehicle, use information related to a smartphone key, and information related to intelligent mobility system (IMS) in addition to a group included in a major classification. In addition, when a driver with a unique habit of driving a vehicle does not want to share relevant information, the vehicle data sharing apparatus 100 may receive a non-consent to an item of the relevant information and apply it in data transmission. For example, a driver may always lie down on a passenger seat or may not consent to share setting information such as non-fastening of a seat belt, and the apparatus 100 may provide and receive such non-consent items and apply them in sharing data.

Referring to FIG. 6, the vehicle data sharing apparatus 100 determines and classifies data urgency and data capacity (S301). The vehicle data sharing apparatus 100 may determine information to be shared in real time to users as data with high urgency (a high level of urgency), and determine information that does not need to be shared in real time as data with low urgency (a low level of urgency). For example, the data with high urgency may include a road accident, traffic situation information, sign information sensed by autonomous vehicles, warning information, road construction information, traffic jam information, autonomous vehicle steering information, autonomous vehicle braking information, basic driving information, vehicle accident related information (EDR/DSSAD and video information), etc.

In addition, the data with low urgency may include vehicle behavior information, vehicle driving information, and the like as data capable of creating meaning through accumulation of a large amount of data.

In addition, the vehicle data sharing apparatus 100 determines that the data capacity is small (small capacity) when the data capacity is less than 1 G, determines that the data capacity is medium size if the data capacity is equal to or greater than 1 G and less than 5G (medium capacity), and determined that the data capacity is large when the data capacity is 5 G or more (large capacity).

When the data urgency is high and the data capacity is small, the vehicle data sharing apparatus 100 transmits data with a small capacity in a 5G transmission mode in real time while the vehicle is driven (S302). For example, data having high data urgency and small data capacity may include sign information, warning information, construction information, etc. sensed by an autonomous driving vehicle.

When the data urgency is high and the data capacity is medium, the vehicle data sharing apparatus 100 transmits data with a slight large capacity in a 4G transmission mode in real time while the vehicle is driven (S303). For example, data having high data urgency and medium data capacity may include traffic congestion information and the like.

When the data urgency is higher and the data capacity is large, it is difficult for the vehicle data sharing apparatus 100 to transmit data in real time, and thus the vehicle data sharing apparatus transmits in a Wi-Fi transmission mode after vehicle driving is terminated (S304). For example, data having high data urgency and large data capacity may include steering information related to an autonomous driving vehicle, braking information related to an autonomous driving vehicle, basic driving information, and accident-related information in the event of a vehicle accident. In the instant case, the vehicle data sharing apparatus 100 may start data transmission when a shifting gear of a vehicle is a P gear, a vehicle speed is 0, an engine is turned off during a Wi-Fi transmission mode.

In addition, the vehicle data sharing apparatus 100 may perform data transmission by use of a sharing platform such as a dedicated transmission app and an AVN built-in program.

The vehicle data sharing apparatus 100 notifies a user (vehicle owner) of a data transmission state through an in-vehicle device or a user terminal during data transmission or after the data transmission is completed (S305). In the instant case, the user terminal may include a mobile communication terminal such as a smart phone or a mobile phone.

In the instant case, the vehicle data sharing apparatus 100 may notify the data transmission mode (e.g., a 5G transmission mode, a 4G transmission mode, and a Wi-Fi transmission mode), a data transmission amount, a data transmission status, a transmission data type, a conversion amount, etc.

In addition, after the data transmission is completed, the vehicle data sharing apparatus 100 may notify monthly and daily summary information related to the data transmission amount and the data transmission state, and the like together therewith.

The vehicle data sharing apparatus 100 may set a credit value for each type of transmission data to perform settlement (S306).

The vehicle data sharing apparatus 100 may set a credit value to a user (vehicle owner) in proportion to a capacity shared by the user for each type of data, and may settle a sum depending on the credit value and notify the user or provide it to an external operator.

For example, the credit value may be set by use of indoor video information: 30 C/GB, position information: 5 C/MB, a type A: 3 C/MB, and a type B: 2 C/MB.

For example, when a user shares data of video information 100 G+position information 1 G+Type A 300 MB+Type B 100 MB, the vehicle data sharing apparatus 100 may obtain 3,000+5,000+900+200 (=9,100 C) to settle monthly as cash or cash equivalents.

As described above, the present invention may subdivide a data sharing range group depending on the vehicle driving subject range, provide a user consent procedure for each data sharing range to the user, receive consent, and perform data sharing, customizing shared data users and increasing user convenience.

The present invention may also expect to improve quantity and quality of shared data by providing a certain portion of revenue for the shared data to the user.

In addition, the present invention may minimize a data transmission cost and maximize a data transmission efficiency by differentially transmitting data using a communication network depending on the urgency and capacity of the data to be shared.

Figure 7:
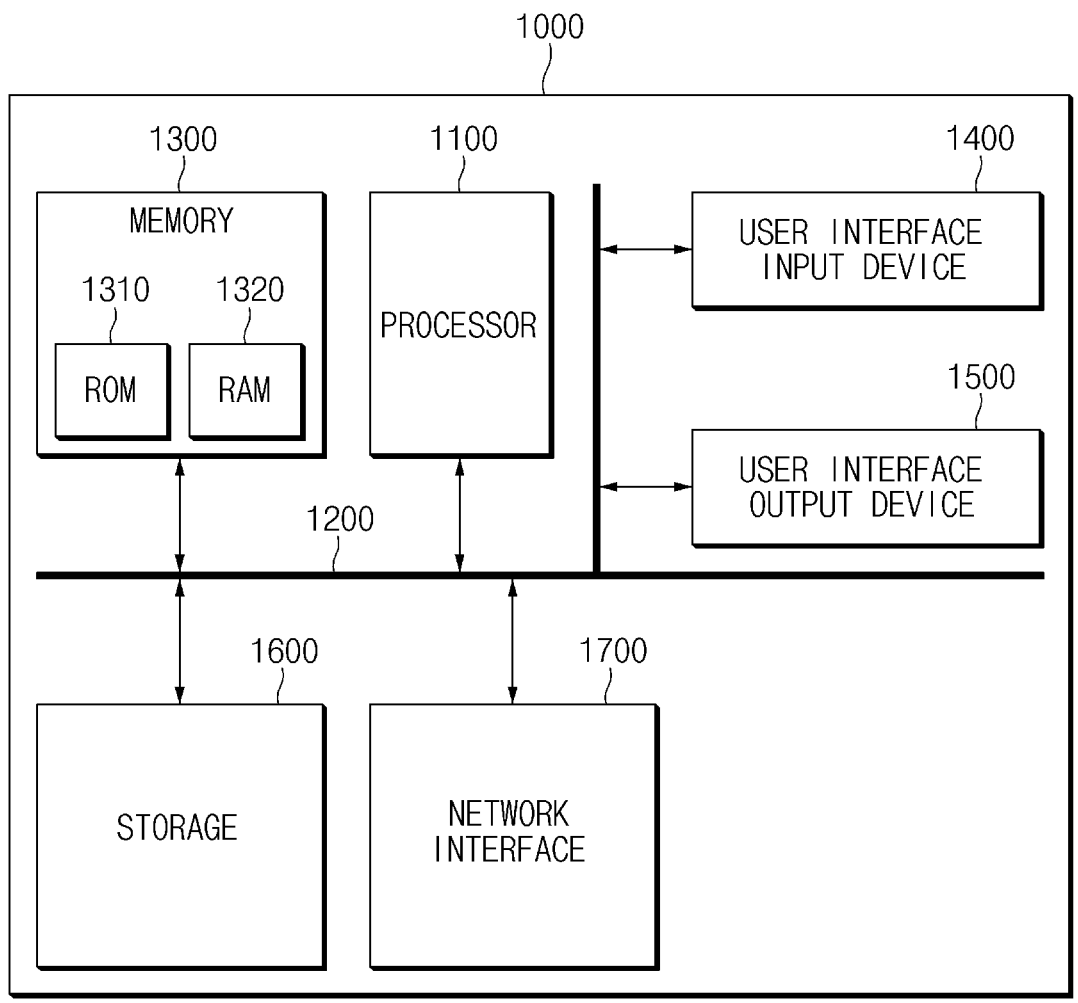
FIG. 7 illustrates a computing system according to various exemplary embodiments of the present invention.

FIG. 7 illustrates a computing system according to various exemplary embodiments of the present invention.

Referring to FIG. 7, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM).

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle data sharing apparatus comprising:
   a processor configured to subdivide a sharing range of vehicle data for each group according to a range of a subject driving a vehicle, and to obtain consent from a user for each subdivided group, to perform vehicle data sharing; and
   a storage configured to register consent information related to a sharing range of vehicle data acquired from the user,
   wherein the processor is further configured to:
      provide guidance information for obtaining the consent from the user for each subdivided group; and
      subdivide the vehicle data into the subdivided group depending on a driving subject range and sharing, and
   wherein the subdivided group includes:
      a first group that includes essential vehicle driving information including a vehicle speed and an operation state of major systems including lamps and doors, essential shared data items, and vehicle driving information that must be essentially shared;
      a second group that includes selectively shared personal information with lowest sensitivity, and information to be consented in a case of a personal vehicle having a plurality of subjects driving the vehicle;
      a third group that includes selectively shared personal information with a medium level of sensitivity, and information to be consented in a case of a personal vehicle having one subject driving the vehicle; and
      a fourth group that includes selectively shared personal information with highest sensitivity, and information with the highest sensitivity for sharing regardless of a subject driving the vehicle.

2. The vehicle data sharing apparatus of claim 1, wherein the processor is configured to identify a driver upon determining that the vehicle is turned on, and to determine whether the driver is a driver who has registered consent information or a driver who has not registered the consent information.

3. The vehicle data sharing apparatus of claim 2, wherein the processor is configured to identify the driver according to at least one of iris information, voice recognition information, fingerprint recognition information, reservation information, and occupant sensing information.

4. The vehicle data sharing apparatus of claim 2, wherein the processor, upon determining that the driver is the driver who has not registered the consent information, obtains consent from the driver for each subdivided group and then shares the vehicle data according to a consented sharing range of the vehicle.

5. The vehicle data sharing apparatus of claim 2, wherein the processor, upon determining that the driver is the driver who has registered the consent information, determines whether the driver is an existing driver who has previously driven the vehicle or is a registered third driver.

6. The vehicle data sharing apparatus of claim 5, wherein the processor is configured to perform sharing the vehicle data according to a predetermined sharing range of vehicle data without an additional consent procedure, upon determining that the driver is already registered and is the existing driver who has driven the vehicle as a result of identifying the driver.

7. The vehicle data sharing apparatus of claim 5, wherein the processor is configured to load previously stored consent information of the third driver and to perform an inquiry to see whether the driver is the third driver, upon determining that the driver is already registered but is the third driver other than the existing driver, and to perform vehicle data sharing by setting the sharing range of vehicle data according to the information that is consented by the third driver, upon determining that the driver is the third driver.

8. The vehicle data sharing apparatus of claim 1, wherein the range of the subject driving the vehicle includes at least one of an owner of a personal vehicle, a family of the owner of the personal vehicle, or a driver of a company vehicle or a shared vehicle.

9. The vehicle data sharing apparatus of claim 1,
   wherein the second group further includes Bluetooth connection information of a driver,
   wherein the third group further includes at least one of navigation destination information and outdoor video information, and
   wherein the fourth group further includes at least one of vehicle position information, indoor video information, personal private information, and contact information.

10. The vehicle data sharing apparatus of claim 1, further including
    an interface device configured to display a screen for receiving information consent of at least one of the first group, the second group, the third group, and the fourth group.

11. The vehicle data sharing apparatus of claim 10, wherein the processor is configured to provide a screen for guiding compensation for information consent through the interface device in addition to the screen for the information consent.

12. The vehicle data sharing apparatus of claim 10, wherein the processor is configured to provide a screen displayed by selecting at least one of the first group, the second group, the third group, and the fourth group by default according to a range of a subject driving the vehicle through the interface device.

13. The vehicle data sharing apparatus of claim 10,
    wherein the processor is configured to provide a screen for consenting to additional information related to details under each of the first group, the second group, the third group, and the fourth group through the interface device, and
    wherein the processor is configured to receive information consent or cancellation of the information consent for one or more of the details from a user.

14. The vehicle data sharing apparatus of claim 1, wherein the processor is configured to separate transmission modes according to urgency and capacity of data to be transmitted.

15. The vehicle data sharing apparatus of claim 14,
    wherein the processor is configured to determine that urgency of data that must be transmitted in a real time is high, and to determine that urgency of data that does not require real-time transmission is low, wherein the processor is configured to share the vehicle data in a real-time transmission mode according to a first communication speed, upon determining that the urgency of the data to be transmitted is high and the capacity of the data to be transmitted is less than a predetermined first reference value, and wherein the processor is configured to share the vehicle data in the real-time transmission mode according to a second communication speed that is lower than the first communication speed, upon determining that the urgency of the data to be transmitted is high, the capacity of the data to be transmitted is more than the predetermined first reference value and less than a predetermined second reference value.

16. The vehicle data sharing apparatus of claim 15, wherein the processor is configured to share the vehicle data in a Wi-Fi transmission mode after vehicle driving is terminated, upon determining that the urgency of the data to be transmitted is high and the capacity of the data to be transmitted is greater than or equal to the predetermined second reference value.

17. The vehicle data sharing apparatus of claim 1, wherein the processor is configured to notify a user of a data transmission state during data transmission or when the data transmission is completed for sharing the vehicle data.

18. The vehicle data sharing apparatus of claim 17, wherein the data transmission state includes at least one of a data transmission mode, a data transmission amount, a data transmission status, a type of transmission data, a settlement sum for transmission data, and monthly or daily summary information related to the data transmission.

19. The vehicle data sharing apparatus of claim 1, wherein the processor is configured to determine total payment of money according to the shared vehicle data to notify the total payment of the user after sharing the vehicle data.

20. A vehicle data sharing method comprising:
subdividing a sharing range of vehicle data for each group according to a range of a subject driving a vehicle;
providing guidance information for obtaining consent from a user for each subdivided group;
obtaining consent from the user for each subdivided group;
sharing the vehicle data according to the sharing range of the vehicle data consented for each user; and
subdividing transmitted vehicle data into data transmission groups depending on a driving subject range and sharing,
wherein the subdivided group includes:
a first group that includes essential vehicle driving information including a vehicle speed and an operation state of major systems including lamps and doors, essential shared data items, and vehicle driving information that must be essentially shared;
a second group that includes selectively shared personal information with lowest sensitivity, and information to be consented in a case of a personal vehicle having a plurality of subjects driving the vehicle;
a third group that includes selectively shared personal information with a medium level of sensitivity, and information to be consented in a case of a personal vehicle having one subject driving the vehicle; and
a fourth group that includes selectively shared personal information with highest sensitivity, and information with the highest sensitivity for sharing regardless of a subject driving the vehicle.

* * * * *